March 14, 1933.  A. V. BODINE  1,901,696
BRAKE BLOCK AND MEANS OF ATTACHING
Filed Nov. 7, 1931

Inventor
Alfred V. Bodine
By Wooster & Davis
Attorneys

Patented Mar. 14, 1933

1,901,696

UNITED STATES PATENT OFFICE

ALFRED V. BODINE, OF FAIRFIELD, CONNECTICUT, ASSIGNOR TO RAYBESTOS-MANHATTAN, INCORPORATED, OF PASSAIC, NEW JERSEY, A CORPORATION OF NEW JERSEY

BRAKE BLOCK AND MEANS OF ATTACHING

Application filed November 7, 1931. Serial No. 573,583.

This invention relates to automobile brakes and brake blocks, and more particularly to the means for securing the blocks to the brake shoe or supporting element.

It has been found from experience that in attaching brake blocks to the shoe, for best results there should be a relatively incompressible material between the bolt head and the shoe. If the material at this point is readily compressible the securing bolt will work loose and the block will slip.

It is therefore an object of the present invention to interpose an incompressible material between the bolt head and the shoe to cooperate with the bolt in holding the block in place so as to reduce to a minimum the liability of the bolt working loose and permitting the block to shift.

With the foregoing and other objects in view the invention consists in certain novel features of construction as will be more fully disclosed in connection with the accompanying drawing. It, however, is to be understood that the invention is not limited to the specific construction shown but that various modifications may be employed without departing from the spirit of the invention.

In carrying out this invention a metal bridge-like structure 10 is mounted in the fibrous material of the brake block or friction element, and in the preferred form shown this insert includes a body portion 11 and laterally projecting prongs 12 at the opposite ends thereof, preferably extending at substantially right angles to the body portion. The body portion may be strengthened and stiffened by longitudinal ribs 13 at its opposite side edges. This element can be either cast, forged or stamped from heavy sheet metal, preferably the latter.

Figures 2, 5:
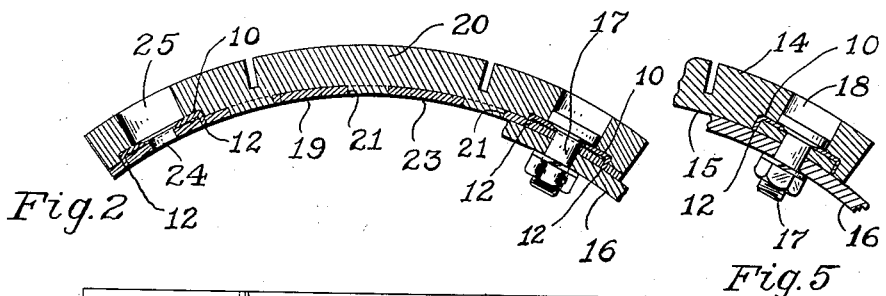
Fig. 2 is a longitudinal section thereof substantially on line 2—2 of Fig. 3, and showing one end attached to a brake shoe.
Fig. 5 is a portion of still another modified construction.

In constructing a simple molded block involving this invention, the desired number of these bridge-like inserts are placed in the bottom of the mold in which the brake block is to be formed, and located at approximately the positions for the securing bolts, and in these molded blocks the prongs 12 are extended downwardly. The mold is then filled with the mixture of fibrous material and the binder, such as asbestos fiber and any suitable binder used in making these molded blocks which hardens on curing, ordinarily by baking under pressure for a given time at a suitable temperature. After this mixture is placed in the mold, it is placed under pressure and cured by heat, and after curing, the bolt holes are drilled at the proper location and the block finished by any other well known methods. In Fig. 5 is shown a section of an end portion of a block in which 14 is the molded block of fibrous material, such as asbestos held together by the binder, and it will be noted that the insert 10 has been molded in this material so that it is really incorporated therein and is in effect an integral part of it, and it is so arranged that the ends of the prongs 12 are exposed at the inner surface 15 of the block so that they rest on the surface of the brake shoe 16 to which the block is secured by the bolts 17 passing through the openings 18. When the openings 18 are drilled they are drilled through the block and the inserts 10, and it will therefore be evident that this insert provides a relatively incompressible material between the bolt head and the shoe which sustains the pressure of the bolt, and as it is practically incompressible the bolts will not work loose and permit the block to shift. It will also be evident that the pressure of the bolt is transmitted to a large extent directly by the prongs 12 to the surface of the supporting shoe 16, which is ordinarily of metal, and the body portion of the insert is further supported by the material of the block pressed beneath it. There is, therefore not much danger of the support for the bolt yielding to permit it to loosen up as is the case where the bolt head is supported only by the compressible fibrous material of the block.

Figure 1:
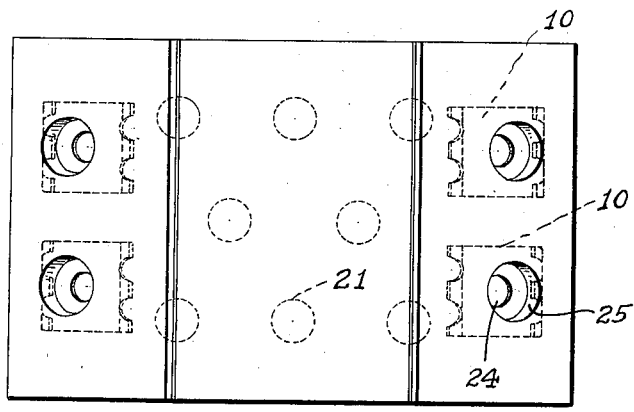
Fig. 1 is a top plan view of the brake block constructed according to this invention.
Figure 3:
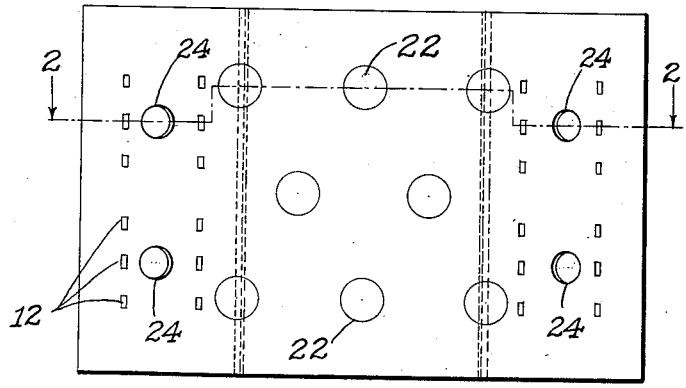
Fig. 3 is a bottom plan view.

In Figs. 1, 2 and 3 is shown the same insert element applied to a somewhat different construction of brake block. This block is formed with an inner backing 19, which is ordinarily asbestos fiber sheeted and saturated with a suitable binder, and which is compressed under heavy pressure so that it is more dense and less compressible than the molded portion of the block. The inserts 10 are mounted by forcing the prongs 12 through this backing and it is placed in the bottom of the mold. The mold is then filled with the mixture of asbestos fiber and the binder and the pressure applied as described in connection with Fig. 5. In order to bind the backing 19 and the molded portion 20 together the backing is provided with any suitable number of recesses 21, preferably in the form of openings through the backing, and when the pressure is supplied to the material in the mold it is of course forced into these recesses to form integral plugs 22. This block is then cured under heat and pressure to secure the desired hardness, and it will be evident that the backing 19 and the molded portion 20 will form a substantially unitary structure. In this type of block the backing 19 is of a material similar to the rest of the block, but has been sheeted and compressed so that it is more dense and less compressible than the molded portion 20. It will be seen from the drawing that the prongs 12 of the inserts 10 extend through the backing 19 to the inner surface 23 thereof so that when the block is mounted on a shoe 16 these prongs will rest on the surface of the shoe and will transmit a large portion of the pressure of the securing bolt 17 directly to the shoe the same as the form shown in Fig. 5. These inserts also assist the plugs 22 in preventing the molded portion 20 coming loose and shifting on the backing 19. The holes 24 for the bolts are drilled through the block and the inserts 10, the outer portion 25 being counter-bored to a larger diameter to accommodate the head of the bolt in the usual manner.

It will be evident from the foregoing description that these bridge-like inserts supported by the prongs and the substance of the block pressed beneath the body portions thereof provide a very difficultly compressible support for the bolt and renders the loosening of the block almost impossible.

Figure 4:
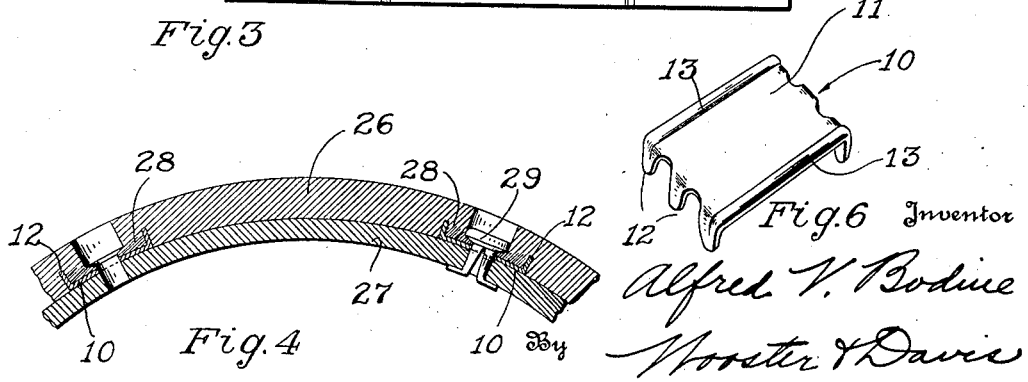
Fig. 4 is a longitudinal section of a block of a somewhat different construction applied to a shoe.
Figure 6:
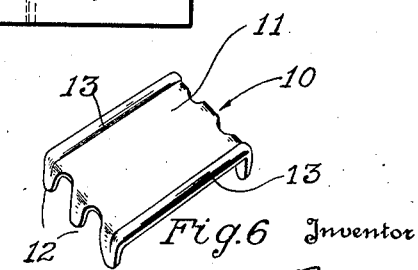
Fig. 6 is a perspective view of a preferred form of metal insert.

In Fig. 4 I have shown how these inserts may be employed with a woven brake block. In this figure the portion 26 indicates a woven brake lining or block formed by weaving together asbestos yarn or metal wire covered with asbestos fibers and saturated with a suitable binder. Before curing, the inserts 10 are forced under high pressure into this woven material so as to be imbedded therein as indicated in Fig. 4. Ordinarily as the compressibility of the material is limited they are pressed into it with the prongs 12 extending inwardly. This leaves a portion of the insert exposed on the surface of the block and substantially flush with this surface so that when the block is mounted on a shoe 27 the insert is in contact with the surface of this shoe. It will be evident that when the insert is forced into the block the fibrous material immediately under the insert is compressed to a much denser condition than the remainder of the block, this highly compressed portion of increased density being indicated by the double cross-hatching at 28. When this block is cured this more highly compressed and denser portion is practically incompressible, and furthermore, is supported by the inserts 10 so that there is practically no yielding of the material of the block under the pressure of the securing blocks or rivets 29, and in this case even though the head of the securing bolt does not directly engage the metal insert but is supported by the highly compressed material 28, there is practically an incompressible material between the head of the bolt and the shoe the same as in the other forms.

With these inserts the pressure of the securing bolt will be absorbed in the insert and will be more widely distributed on the surface of the shoe, and when keeper slots occur in the shoe will distribute this pressure on both sides of the slot.

Throughout the specification and claims I have used the term "bolt" to indicate the securing element in the generic sense as meaning either a bolt, a rivet, or other similar securing means.

Having thus set forth the nature of my invention, what I claim is:

1. In a brake, a shoe, a friction element of fibrous material, a metal bridge element embedded in the fibrous material and comprising a body portion and prongs projecting laterally therefrom and resting on the surface of the shoe, and a securing bolt passing through said body portion for securing the friction element to the shoe.

2. A brake block comprising fibrous material held together by a binder, a metal bridging element molded in said fibrous material comprising a body portion and laterally projecting prongs extending to the surface of the block to engage a shoe to which the block is connected, and said bridging element having an opening for a securing bolt.

3. A brake block comprising a backing of compressed fiber held together by a binder, said backing having recesses therein, a body portion of fiber held together by a binder molded against one side of said backing with portions extending into said recesses, and a metal bridging member molded in the body portion and having an opening for a securing bolt.

4. A brake block comprising a backing of compressed fiber held together by a binder, said backing having receses therein, a body portion of fiber held together by a binder molded against one side of said backing with portions extending into said recesses, and a metal bridging member molded in said body portion having laterally projecting prongs extending through the backing to engage the surface of a shoe to which the block is connected, said bridging member having an opening for a securing bolt.

5. A brake block comprising a backing of compressed fiber held together by a binder, said backing having recesses therein, and a body portion of fibrous material held together by a binder molded and pressed against one side of the backing with portions extending into said recesses, the combined back and body portion being cured to secure the desired hardness.

6. A brake block comprising woven fibrous strands held together by a binder, and a metal bridging element pressed into the woven material from one side so as to compress the fiber under the element, said element and the compressed fiber forming a pressure resisting support for an attaching bolt.

7. A brake block comprising woven fiber strands held together by a binder, a metal bridging element including a body portion and laterally projecting prongs, said element being pressed under pressure from one side into the woven material to highly compress the fiber under the element, and the body portion thereof having an opening for a securing bolt.

In testimony whereof I affix my signature.

ALFRED V. BODINE.